May 24, 1938.  E. P. EASTWICK, JR  2,118,776
DEVICE FOR PREVENTING SKIDDING
Filed June 2, 1936  2 Sheets-Sheet 2
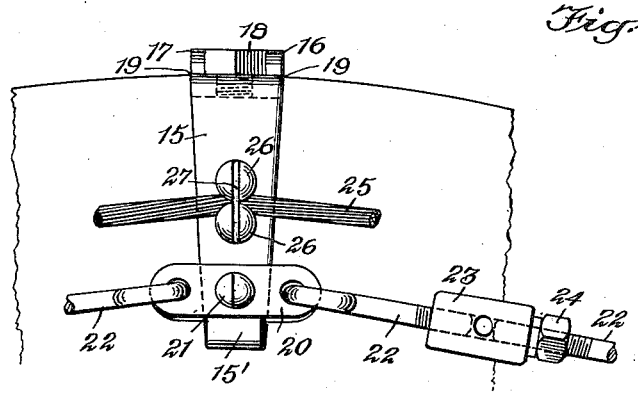
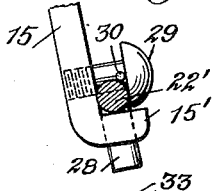
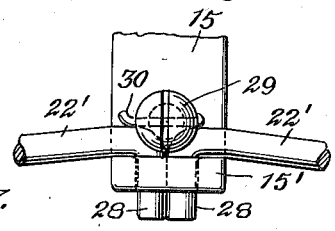
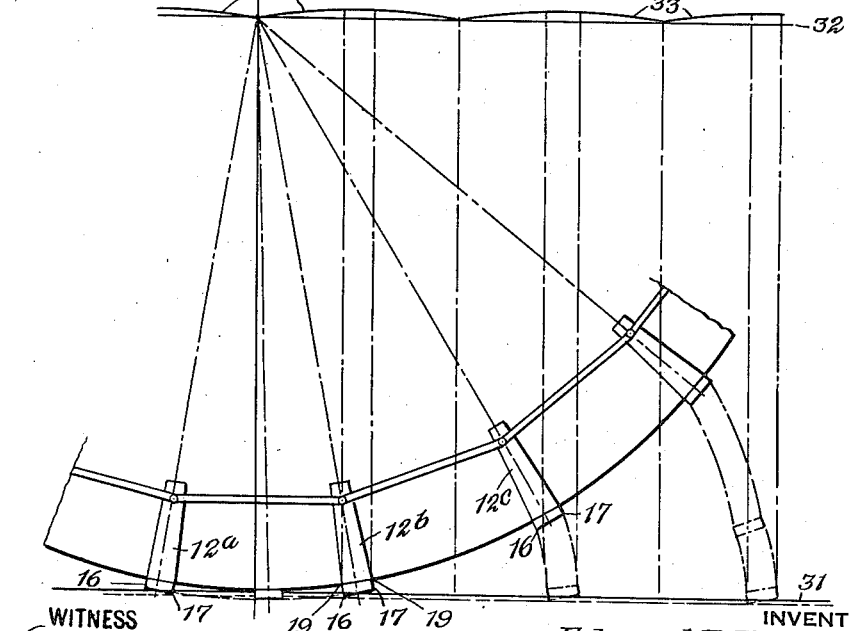
INVENTOR
Edward P. Eastwick Jr.
BY
ATTORNEYS Patented May 24, 1938

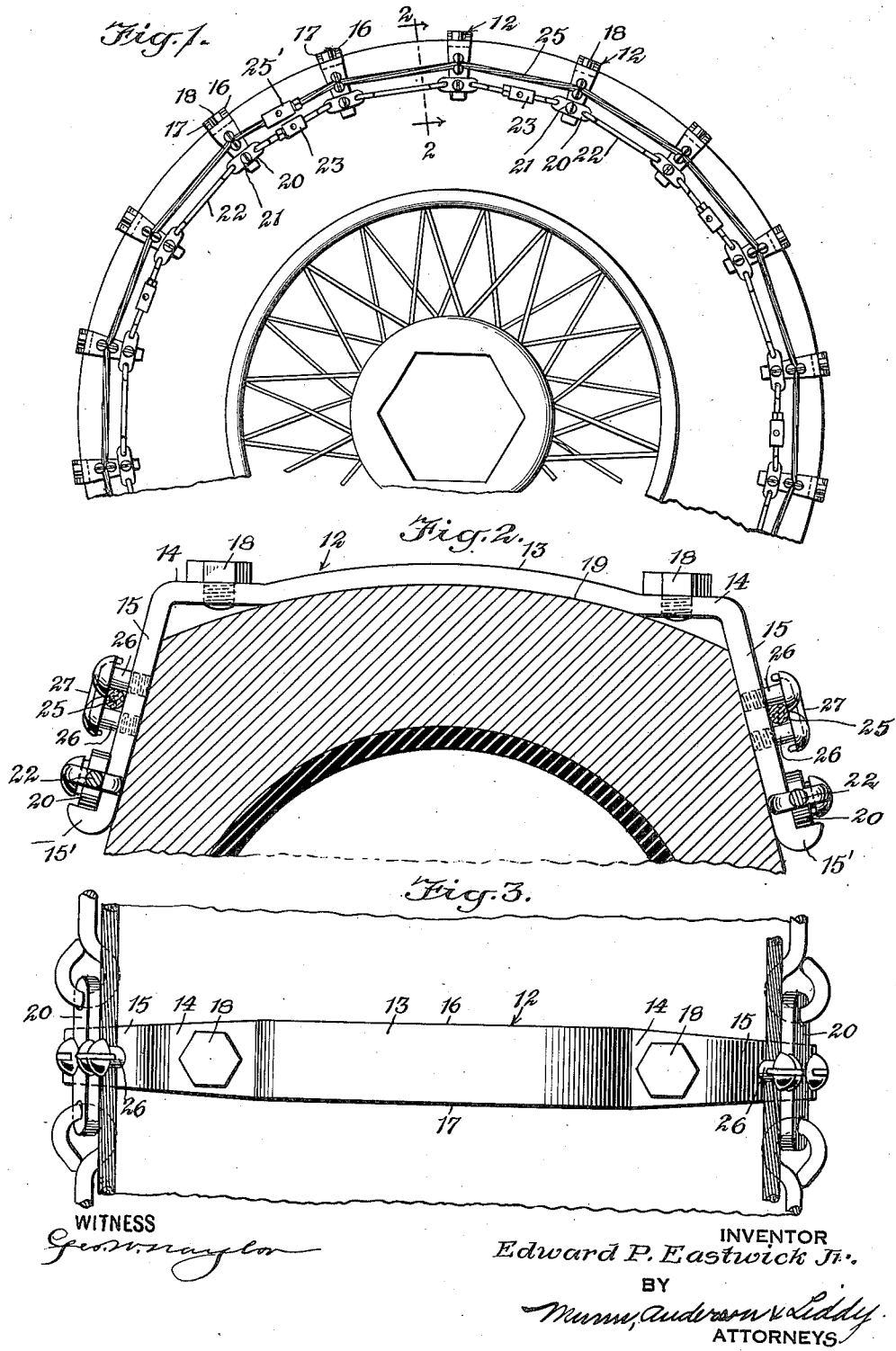

2,118,776

UNITED STATES PATENT OFFICE 2,118,776

DEVICE FOR PREVENTING SKIDDING

Edward P. Eastwick, Jr., Greenwich, Conn.

Application June 2, 1936, Serial No. 83,044

1 Claim. (Cl. 152—225)

This invention relates to improvements in devices for preventing skidding. My device may be used in association with many types of vehicles, but is particularly suited for use in association with automobiles.

Heretofore motorists have depended upon the tire tread or have applied skid chains to the tires to prevent skidding. Both of these expedients, however, have proven to be far from satisfactory. The tread is soft and permits of skidding and does not provide sufficient traction on ice, hard snow, or the like, and releases its grip on soft surfaces, such as mud, and at any rate it soon wears smooth. Skid chains do not provide sufficient grip, are ineffectual to prevent sidewise skidding, and furthermore they wear rapidly and break causing injury to the fender and to the adjacent parts of the automobile.

It is accordingly an object of my invention to overcome these difficulties by means of an improved device for preventing skidding, which prevents skidding in any direction, which provides ample traction on all types of surfaces, and which is long wearing and accordingly minimizes the danger of breakage.

A further object is to provide an improved device of the above character which can be readily applied to the wheels of a vehicle and which can be conveniently packed in a relatively small space when not in use.

Among other objects is the provision of a device for preventing skidding which when applied to the wheels of a vehicle does not interfere with the riding comfort and which also is provided with readily replaceable parts which can be easily replaced when worn or broken.

My invention contemplates the provision either at regularly spaced intervals around the entire wheel or at one or more points on the wheel of substantially transverse members or a single transverse member having sharpened cutting edges adapted to receive the full weight of the portion of the car carried by the wheel and to cut into any hard surface such as snow, ice, or the like, and to grip soft surfaces such as mud, thereby preventing skidding in any direction and providing ample traction for the movement of the vehicle.

With these and other objects in mind, reference should be had to the accompanying drawings, in which Fig. 1 is a side view of the wheel of an automobile (with the lower portion omitted) having applied thereto a device for preventing skidding which embodies my present invention;

Fig. 2 is a sectional view in the direction of the arrows on the line 2—2 of Fig. 1;

Fig. 3 is a plan view of one of the transverse members forming a part of my invention;

Fig. 4 is a side view showing in detail one side of the transverse member (both sides being the same) and the associated connecting parts;

Fig. 5 is a detail view partially in section showing a modified type of connecting mechanism for holding the transverse members in position;

Fig. 6 is a front view showing the modified type of connecting mechanism;

Fig. 7 is a diagram showing the manner of operation of a wheel having my improved device for preventing skidding attached thereto.

In the accompanying drawings my device is illustrated as applied to the tire of an automobile although it is to be understood that it may be used in association with the wheels of other types of vehicles.

In carrying out my invention transverse members formed as hereinafter described are secured at one or more points to the tire of an automobile by means of suitable fastening means. In the preferred form of my invention, as shown in the drawings, the transverse members indicated by the numeral 12 are secured at regularly spaced intervals around the entire wheel.

The transverse element 12 is preferably made from a strip or bar formed of a hard spring metal and is preferably provided with a central arcuate portion 13 which is preferably curved on its upper and lower surfaces so as to conform with the curvature of the tire to which it is applied. On either side of the curved or arcuate central portion are formed substantially horizontal portions 14 both terminating in depending ends 15 which extend downwardly from the horizontal portions at a slight angle so that when applied to the tire, as shown, they engage the sides thereof. At the end of each of the depending portions 15 is formed a small lip or flange 15' which aids in securing the transverse member in position.

Instead of providing the transverse member with the arcuate central portion 13, as shown and described, so as to conform with the curvature of the tire, the upper surface of the central portion may be substantially flat and disposed in the same horizontal plane. However, it has been found that the curved lower surface bearing on the tire aids in holding the transverse member firmly in position on the tire which is important in the proper functioning of the device. The front and rear edges indicated at 16 and 17 of the transverse member are formed so as to be sharp, thereby providing a pair of cutting edges which will cut into and grip the surface over which the wheel is rotating. The edges 16 and 17 serve principally in preventing forward or rearward skidding of the automobile and also in providing traction when the wheels are rotated.

To prevent sidewise skidding of the vehicle in addition to the cutting edges 16 and 17, I provide projecting members on both sides of the arcuate portion 13 and these preferably consist of a pair of bolts 18 screwed into threaded openings formed in the horizontal portions 14 on the two sides of the arcuate central part of the transverse member. The heads of the bolts 18 are multi-sided, preferably hexagonal, thereby providing a plurality of cutting edges facing in different directions serving to prevent skidding of the vehicle in any direction. The transverse member is so formed and the hexagonal heads on the top of the bolts are of such a size that the tops of the bolts and of the arcuate portion 13 are in the same or substantially the same horizontal plane so that the cutting edges 16 and 17 and the cutting edges of the bolts can engage the surface of the road at the same time. As the heads of the hexagonal bolts wear the bolts may be unscrewed to a slight degree and adjusted so that their tops will remain in substantially the same plane as the top of the arcuate portion 13. If desired, spacers and lock washers may be used in association with the bolts 18 to hold them firmly in proper position.

In order that the transverse member may be more firmly attached to the tire the under surface of the transverse member is also provided with edges 19 which in any movement around the points of attachment 21 to the connecting means will cause these edges to press into the rubber or other material of the tire as will be apparent from Figs. 4 and 7. It will be apparent that any attempted movement of the transverse member about the points of attachment 21 would be pivotal in character resulting in the transverse portion 13 moving or attempting to move through an arch with the result that the edges 19 will press into the tires and prevent such movement.

In the preferred form of my invention, to secure the transverse members in position I provide connecting means extending completely around the tire and connected to each of the transverse members. There are similar connecting means for both of the depending portions 15 of the transverse members and they extend around the inside and outside respectively of the tire. One form of connecting means which produces satisfactory results is shown in the first four figures of the drawings and consists of plates 20 secured adjacent the lower end of the depending portions 15 of the transverse members and provided with openings at their ends for receiving the eye portions of links 22 connected to adjacent transverse members. So that the transverse members may be firmly secured around the tire, several of the links 22 are provided with adjusting means and this may be accomplished by forming these links in two sections, each having a threaded end for receiving a turnbuckle indicated at 23 which may have a lock nut 24 in association therewith. Very satisfactory results have been secured by thus forming every other link in two sections and providing a turnbuckle as described.

Each plate 20 is suitably secured to the lower portion of the transverse member as by means of a bolt 21 which may be locked in position by means of a pin extending through the bolt or by means of a lock washer. In addition to the connecting means just described which is provided at both the inside and outside of the wheel and which under normal conditions serves in a very satisfactory manner to retain the transverse members in position, auxiliary connecting means may also be provided so as to prevent the transverse members from flying outwardly and striking the fender or other adjacent portions of the car should the principal connecting means break. A suitable auxiliary connecting means is shown in the accompanying drawings and consists of wire cables 25 having their ends secured as by turnbuckles 25' extending completely around the inside and outside of the wheel respectively adjacent the principal connecting means and secured to each of the transverse members. Thus a pair of bolts 26 may be threaded in openings formed in the depending portions 15 of the transverse members and the cable inserted under the heads thereof as shown. To prevent the bolts 26 from accidentally unscrewing, a pin 27 may be connected therebetween as shown.

It is to be understood that the connecting means as described above may be changed in many respects and be made in many different ways. In Figs. 5 and 6 a modified and less expensive type of connecting means is shown in which the links 22' corresponding to the link 22, instead of being provided with eyes on their ends, are provided with downwardly depending portions 28 which extend through openings formed in the lips or flanges 15' and are held in position by bolts 29 preferably provided with pins 30 extending therethrough to prevent them from accidentally unscrewing. When this type of connecting means is employed, the downwardly depending ends 15 of each transverse member, instead of tapering to a relatively narrow end as shown in the first four figures of the drawings, are substantially rectangular in shape so that the lip or flange portion 15' is somewhat broader. Alternate links are likewise preferably formed in two sections and provided with turnbuckles in the form of connecting devices.

In applying the preferred form of my device to the wheels of an automobile, the transverse members and the connecting and auxiliary connecting means are first assembled and placed on the tire much in the manner that a chain is applied to the tire and the turnbuckles are then tightened so as to hold the transverse members firmly in position. The transverse members are preferably spaced in such a manner that the cutting edge of one of the transverse members is always in contact with the ground and so that the weight of the portion of the car carried by the wheel is sustained by the cutting edges and the tire itself does not bear on the surface or but very lightly and only after a cutting edge has penetrated it. The spacing, of course, will vary with the curvature of the wheel and with the thickness of the material from which the transverse members are made.

When the transverse members are thus formed, the cutting edge 16 of one transverse member will first touch the ground and the wheel will then pivot about that point until the cutting edge 17 of the same transverse member touches the ground, and thereafter the wheel will pivot about the cutting edge 17 until the wheel rotates a sufficient amount for the cutting edge 16 of the next transverse member to touch the ground, when the action is again repeated. It will be seen that in this manner the entire weight of that portion of the car is exerted through the wheel successively upon the several cutting edges, thereby causing them to cut through ice, hard snow, or similar hard surface. In this manner the entire portion 13 of the transverse member will in many instances be embedded in the surface material which it contacts. At any rate the cutting edges 16 and 17 and the cutting edges of the bolts 18 will be firmly embedded and will prevent skidding in any direction.

The above described action is brought out by the diagram in Fig. 7 of the drawings in which it will be seen that the cutting edge 17 of one transverse member and the cutting edge 16 of the adjacent transverse member are both in contact with the ground indicated by the full line 31. If the wheel is revolved in a clockwise direction it will be seen that the wheel will pivot around the cutting edge 16 of the transverse member 12b and thence around the cutting edge 17 of the transverse member 12b until the cutting edge 16 of the transverse member 12c reaches the ground, and then the pivoting will take place around that point. The action will thus be repeated with each of the transverse members. It will be appreciated that the entire weight of that portion of the car will be placed upon the cutting edge about which the pivoting takes place, thereby causing it to be embedded in the surface of the road even though it be formed of ice or hard snow. The cutting edges of the heads of bolts 18 being in the same horizontal plane will likewise be embedded. In this manner skidding in any direction will be effectively prevented and ample traction for the movement of the vehicle will be secured.

The diagram in Fig. 7 also illustrates the manner in which my device for preventing skidding provides for smooth riding of the vehicle to which the device has been attached. The horizontal line 32 near the top of the diagram represents the line along which the center of the wheel would travel if it moved in an absolutely even plane. The series of arcuate lines 33 represent the path of travel of the center of the wheel when my device has been attached thereto. It will be seen that the center of the wheel moves through a series of arcs having a gradual and substantially uniform curvature, and in this manner the riding comfort of the car is disturbed to a minimum degree. When chains have been applied to the wheel, the center thereof will move through a rather jerky and uneven line and will interfere with the smooth riding of the car.

In the preferred form of my invention, when the device is not in use the bolts 21 and 26 may be removed from the transverse members so as to release the connecting and auxiliary connecting means therefrom. The transverse members may then be nested one inside the other and packed in a relatively small space and the connecting means and auxiliary connecting means can be formed into a compact bundle. In assembling the device for use, the transverse members 12 and the connecting and auxiliary connecting means are first assembled and then placed on the tire. Turnbuckles 23 and 25' are then tightened to the desired degree so as to hold the transverse members firmly in position so that they will not move or slip with respect to the tire. When the wheel rotates upon the movement of the vehicle it will pivot successively around the cutting edges 16 and 17, the entire weight of the wheel being for a time upon each of the successive cutting edges, causing them to become embedded in the surface which they contact, preventing skidding and providing the desired traction. The edges 19 prevent movement of the transverse members with respect to the tire and assure the effective operation of the device.

When a wheel having my improved device attached thereto rotates, it pivots successively about the cutting edges 16 and 17 and for the pivotal period the entire weight carried by the wheel is carried by the cutting edge causing it to cut into the road surface which it contacts and embed the member therein. The cutting edges of the hexagonal heads of bolts 18 likewise cut into the surface of the road and prevent sidewise skidding.

In the preferred form of my invention the tire itself at no time bears with the full weight carried by the wheel against the road surface but the transverse members are so formed and spaced that the weight is carried at all times by the successive cutting edges. The edges 19 prevent movement of the transverse members with respect to the tires and assure the effective operation of my device.

All of the cutting edges should be sharpened from time to time by grinding or filing them and in this manner the efficient operation of the device will be assured. From time to time as wear takes place, in the preferred form of my invention the bolts 18 should be adjusted so that their heads remain in substantially the same horizontal plane as the top of the arcuate portion 13 of the transverse member.

It will be seen from the herein illustrated and described embodiments that I have provided an improved device for preventing skidding, which effectively prevents skidding in any direction; which provides traction for the movement of the vehicle; which is relatively inexpensive to manufacture and can be assembled in a very simple manner, in which danger of breakage or wear is reduced to a minimum, and which when not in use can be packed into a compact space. It should be understood that many modifications may be made in my invention, such as eliminating the arcuate portion 13 from the transverse member 12 and providing a straight transverse portion in the same horizontal plane, and by employing other suitable means for securing the transverse members 12 and 12' in position at the desired points around the tire. It should also be understood that the transverse members need not be disposed exactly parallel to the axle of the wheel but may cut transversely across the tire at an angle thereto.

I claim:

A device to be attached to a vehicle wheel for preventing skidding comprising a plurality of anti-skidding members adapted to be placed transversely of the tread of the tire of the wheel in spaced relation around the periphery thereof, said members being formed with depending ends engaging the sides of the tire, attaching means for holding the anti-skidding members in the desired spaced relation comprising a plurality of separate plates each having pivotal connection with a depending end of one of the members and links connected between the plates, and auxiliary attaching means comprising flexible means having connection with the depending ends of said members.

EDWARD P. EASTWICK, Jr.